No. 840,358. PATENTED JAN. 1, 1907.
A. D. MORRIS.
METALLIC PACKING FOR ROCKING OR ROTATING RODS OR SHAFTS.
APPLICATION FILED OCT. 11, 1906.
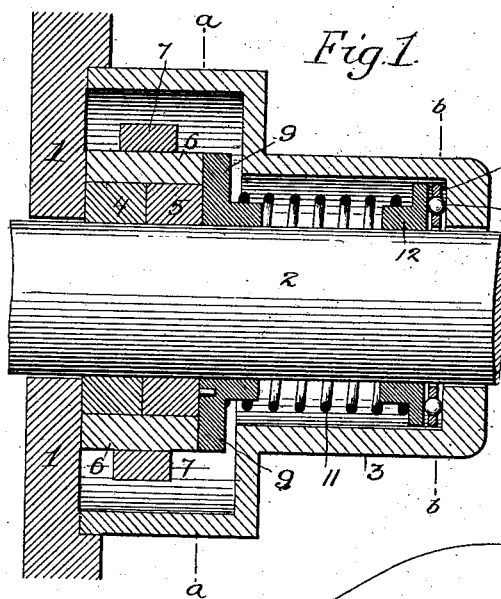
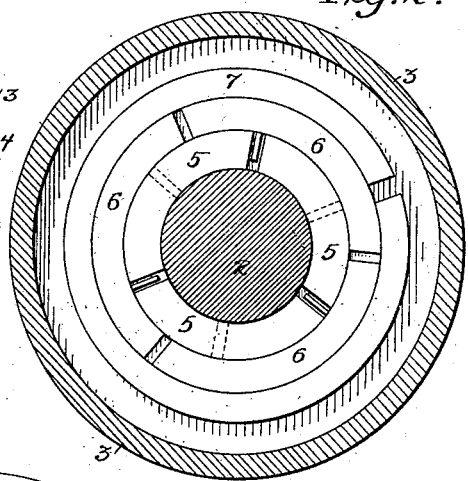
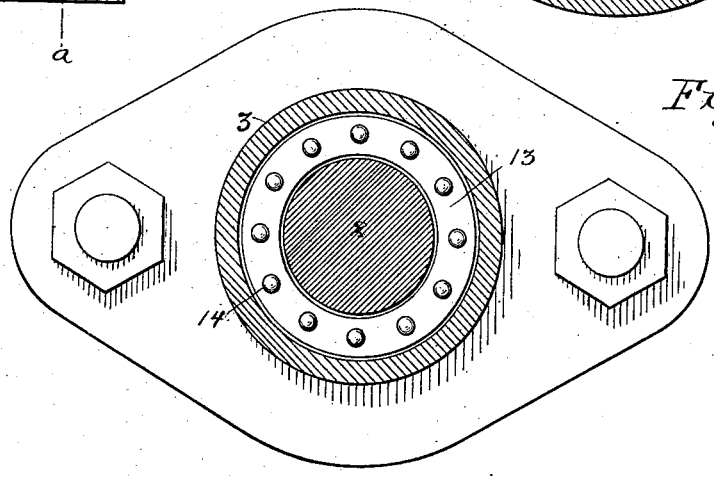
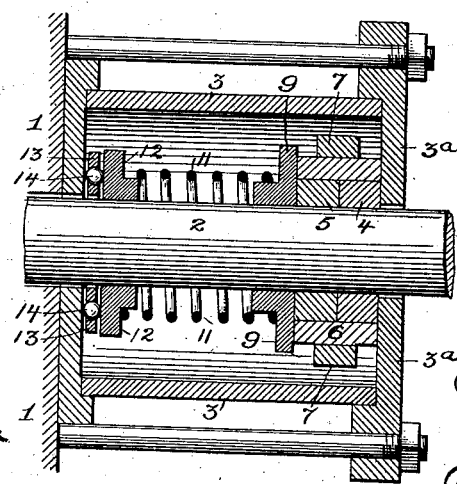
Witnesses
H. L. Smith.
Hamilton D. Turner.
Inventor
Alfred D. Morris
by his Attorneys
Smith & Frazier

UNITED STATES PATENT OFFICE.

ALFRED D. MORRIS, OF PHILADELPHIA, PENNSYLVANIA.

METALLIC PACKING FOR ROCKING OR ROTATING RODS OR SHAFTS.

No. 840,358.

Specification of Letters Patent.

Patented Jan. 1, 1907.

Application filed October 11, 1906. Serial No. 338,484.

*To all whom it may concern:*

Be it known that I, ALFRED D. MORRIS, a citizen of the United States, residing in Philadelphia, Pennsylvania, have invented certain Improvements in Metallic Packing for Rocking or Rotating Rods or Shafts, of which the following is a specification.

The object of my invention is to prevent the grooving or cutting of the rod by the action thereupon of the packing-rings which surround the same. This object I attain by clamping the rings so firmly to the rod that they will partake of the rocking or rotating movement of the latter, the end faces of the rings having sliding contact with the portion of the fixed structure surrounding the rod or shaft.

In the accompanying drawings, Figure 1 is a longitudinal sectional view of a stuffing-box for a rocking or rotating rod or shaft, said stuffing-box being provided with metallic packing constructed in accordance with my invention. Fig. 2 is a transverse section on the line $a\ a$, Fig. 1. Fig. 3 is a transverse section on the line $b\ b$, Fig. 1; and Fig. 4 is a longitudinal section of another form of stuffing-box equipped with my improved rod-packing.

The great objection to the use of fibrous or metallic packing in connection with rods or shafts having rocking or rotating movement is the grooving or cutting of the rod due to the pressure of the packing thereon, the packing being ordinarily held against rotating movement and the frictional wear of the packing upon the rod being constantly exerted at the same point. This objection is particularly evident when the shaft rotates at a high rate of speed, as in the case of the modern turbine-engine. My invention has therefore been designed with the view of overcoming this objection.

In Figs. 1, 2, and 3 of the drawings, 1 represents part of the head or other portion of a cylinder, valve-chest, or other structure having an internal member with rocking or rotating rod 2, which projects beyond the fixed structure and which must therefore be provided with packing to prevent the escape of steam or other motive fluid around the same. The stuffing-box casing 3 is rigidly bolted to the head 1 and contains any available form of metallic packing having contractile rings, the packing shown in the present instance having a pair of internal rings 4 and 5, disposed end to end and bearing upon the rod or shaft, and an outer ring 6, which envelops the pair of internal rings, each of the rings 4, 5, and 6 being composed of segments so disposed that the rings break joint with one another, as shown in Fig. 2.

Surrounding the outer ring 6 is a split ring 7, which has a normal tendency to contract, and thereby press the inner rings 4 and 5 firmly into contact with the rod 2, said split ring 7 being so heavy and its contractile force being so great that the complete ring structure is caused to partake of the rocking or rotating movement of the rod or shaft, overcoming the friction due to contact of the inner rings 4 and 6 with the outer face of the head 1, against which they are held in contact by the action of the spring-pressed follower 9. By reason of this construction frictional wear of the rod, due to its rocking or rotating movement, is entirely eliminated, the wear being wholly upon the inner ends of the rings 4 and 6, which can be readily replaced when necessary.

The spring-pressed follower 9 rotates with the packing-rings, and to insure such rotation a pin 10 upon one of the ring-segments may project into a corresponding opening in the ring 9, as shown in Fig. 1. To prevent torsion of the spring or the scraping of one end of the same against its contact-face on the ring 9, said spring is caused to rotate with the ring 9 and imparts rotating movement to an outer follower 12, between which and the inner face of the cap of the stuffing-box is interposed an antifriction device consisting of a ring 13, carrying balls 14, which contact with the inner face of the stuffing-box and with the outer face of the ring 12, as shown in Fig. 1.

In Fig. 4 I have illustrated the application of my invention to a stuffing-box in which the packing-rings 4 and 6 contact with the cap $3^a$ of the stuffing-box casing, the spring-pressed follower and its appurtenances being interposed between the inner faces of the rings and the head 1, in which case the pressure of the steam or other motive fluid aids the split ring 7 and follower 9 in maintaining contact of the packing-rings, respectively, with the rod and stuffing-box cap.

I claim—

1. A metallic packing for a rocking or rotating rod or shaft, said packing consisting of a contractile-ring structure confined to said rod or shaft and partaking of the movement of the same, a contractile member of said ring structure having sliding contact at one end with a portion of the structure surrounding the rod or shaft.

2. A metallic packing for a rocking or rotating rod or shaft, said packing having contractile rings, and a split ring enveloping the same and serving to confine them so tightly to the rod or shaft that they partake of the movement of the same, one end of the ring structure having sliding contact with a portion of the structure surrounding the rod or shaft.

3. A metallic packing for a rocking or rotating rod or shaft, said packing comprising a contractile-ring structure surrounding the shaft, means for confining said ring structure so firmly to the rod or shaft that it will rock or rotate therewith, and a spring-pressed follower acting upon one end of the ring structure and serving to press the other end of the same into contact with a portion of the fixed structure surrounding the rod or shaft.

4. A metallic packing for a rocking or rotating rod or shaft, said packing consisting of a contractile-ring structure confined to the rod or shaft so as to partake of the movement of the same, a follower whereby said ring structure is pressed into contact with a portion of the fixed structure surrounding the rod or shaft, a spring for acting upon said follower, and an antifriction-bearing between said spring and a portion of the fixed structure opposed to that against which the packing-rings bear.

In testimony whereof I have signed my name to this specification in the presence of two subscribing witnesses.

ALFRED D. MORRIS.

Witnesses:
HAMILTON D. TURNER,
KATE A. BEADLE.